United States Patent [19]

Yates, III et al.

[11] Patent Number: 4,916,185

[45] Date of Patent: Apr. 10, 1990

[54] OLEFINIC IMPACT MODIFIERS FOR COMPATIBLE BLENDS OF POLYPHENYLENE ETHERS AND LINEAR POLYESTER RESINS

[76] Inventors: John B. Yates, III, 38 Chrisken Dr., Glenmont, N.Y. 12158; Charles F. Pratt, Henri de Winterlei 3, 2130 Brasschaat, Belgium; Angelika H. McHale, 325 Roosevelt, Mt. Vernon, Ind. 47620

[21] Appl. No.: 94,552

[22] Filed: Sep. 9, 1987

[51] Int. Cl.4 .................. C08L 51/04; C08L 69/00; C08L 71/04
[52] U.S. Cl. ............................ 525/67; 524/121; 525/208; 525/394; 525/396; 525/397; 525/905
[58] Field of Search .............. 525/68, 394, 397, 903, 525/67

[56] References Cited

U.S. PATENT DOCUMENTS 3,221,080 11/1965 Fox ........................ 525/394
3,383,435 5/1968 Cozek .................... 525/152
4,172,859 10/1979 Epstein .................. 525/187

FOREIGN PATENT DOCUMENTS 159847 3/1983 Japan .................... 525/397

Primary Examiner—Jacob Ziegler

[57] ABSTRACT

Thermoplastic compositions comprising polyphenylene ethers and polyesters, impact-modified by glycidyl (meth)acrylate grafted EPDM and compatibilized by an aromatic polycarbonate exhibit high impact strength alone and when combined with other impact modifiers. Their shear sensitive viscosity properties makes them uniquely suitable for extrusion and blow molding applications.

12 Claims, No Drawings

OLEFINIC IMPACT MODIFIERS FOR COMPATIBLE BLENDS OF POLYPHENYLENE ETHERS AND LINEAR POLYESTER RESINS

This invention relates to impact modified thermoplastic molding compositions and, more particularly, to glycidyl methacrylate or glycidyl acrylate grafted EPDM impact modifiers for compatible blends of polyphenylene ethers and linear polyesters.

BACKGROUND OF THE INVENTION

This invention relates to novel resinous compositions with high impact resistance, solvent resistance, tensile strength, thermal stability and shear sensitive viscosity, making them uniquely suitable for extrusion and blow molding. More particularly, it relates to improved compositions comprising polyphenylene ethers and linear polyesters.

The polyphenylene ethers are a widely used class of thermoplastic engineering resins characterized by excellent hydrolytic stability, dimensional stability, toughness, heat resistance and dielectric properties. They are also resistant to high temperature conditions under many circumstances. Because of the brittleness of many compositions containing polyphenylene ethers, they are frequently blended with impact modifiers such as elastomers to form molding compositions.

A disadvantage of the polyphenylene ethers which militates against their use for molding such items as automotive parts is their low resistance to non-polar solvents such as gasoline. For increased solvent resistance, it would be desirable to blend the polyphenylene ethers with resins which have a high degree of crystallinity and therefore are highly resistant to solvents. Illustrative of such resins are the linear polyesters including poly(alkylene dicarboxylates), especially the poly(alkylene terephthalates). However, such blends frequently undergo phase separation and delamination. They typically contain large, incompletely dispersed polyphenylene ether particles and no phase interaction between the two resin phases. Molded parts made from such blends are typically characterized by extremely low impact strength.

In copending, commonly assigned U.S. patent application Ser. No. 891,457, filed July 29, 1986, there are disclosed highly compatible, impact and -solvent-resistant polymer blends containing polyphenylene ethers and poly(alkylene dicarboxylates), and resinous molding compositions suitable for use in the fabrication of automotive parts and the like. That invention is based on the discovery of a new genus of compatible blends containing polyphenylene ethers and poly(alkylene dicarboxylates) in weight ratios as high as 1:1, or even higher under certain circumstances, and a method for their preparation. According to that application, there are also incorporated in the resinous composition an impact modifier compatible with the polyphenylene ether component and a compatibilizing agent containing a substantial proportion of aromatic polycarbonate structural units. Among the impact modifiers disclosed to be useful in such compositions were various elastomeric copolymers of which examples were ethylene-propylene-diene polymers (EPDM's); carboxylated ethylene propylene rubbers; block copolymers of styrene with dienes and core-shell elastomers containing, for example, a rubbery polyacrylate phase and a polystyrene phase.

In copending commonly assigned U.S. patent application Ser. No. 37,763, filed Apr. 13, 1987, there are disclosed impact resistant polyphenylene ether and linear polyester compositions in which the impact modifier comprises a glycidyl methacrylate or acrylate grafted onto a rubber olefin polymer backbone, especially preferably, an EPDM backbone. In the mentioned application, it is stated to be important that the polyphenylene ether resin be functionalized, e.g., by reaction with an anhydride, before being impact modified, thus perhaps providing a chemical reaction between the resin and the modifier. In the disclosed compositions, however, there are certain drawbacks, even though they are eminently suitable for many uses. Polyphenylene ether resin compositions alone tend to lack chemical resistance making them relatively unsuitable for use, for example, around solvents and motor fuels. The polyester compositions, or the other hand, provide enhanced chemical resistance and heat resistance, but the blends with polyphenylene ethers are somewhat brittle when molded and when an impact modifier is added, such as a styrene-ethylene-butylene-styrene block copolymer, they provide molded articles which are very brittle.

If, however, a compatibilizing agent containing a substantial proportion of aromatic polycarbonate structural units is used in combination with a glycidyl methacrylate or glycidyl acrylate grafted EPDM rubber as an impact modifier for polyphenylene ether-polyester compositions an unexpected improvement in ductility is achieved and as a result there is seen a substantial improvement in the impact strength of articles molded from such compositions, and this is true whether or not a functionalized polyphenylene ether is used. While the reasons for the foregoing are not clearly understood at this time, it is believed that the particular modifier used is chemically reactive with the polyester component whereas the prior composition used impact modifiers tending to be compatible with the polyphenylene ether component exclusively. Thus the present compositions, in contrast to the prior compositions, are believed to be impact modified through the polyester phase, and are thus morphologically distinct.

SUMMARY OF THE INVENTION

In accordance with the present invention there are provided impact modified thermoplastic compositions, and methods for their production, said modified thermoplastic compositions comprising
 (a) a compatible resin composition comprising
  (i) at least one polyphenylene ether resin, alone, or in combination with a polystyrene resin:
  (ii) at least one poly(alkylene dicarboxylate) resin, the weight ratio of component (i) to component (ii) being at most 1.5:1; and
  (iii) at least one polymer containing a substantial proportion of aromatic polycarbonate units, alone, or in combination with a styrene homopolymer; and
 (b) an effective amount of an impact modifier comprising an EPDM terpolymer grafted with glycidyl methacrylate or glycidyl acrylate or a mixture thereof, alone, or grafted in further combination with a $C_1$–$C_{18}$ alkyl methacrylate or acrylate or a mixture thereof, alone, or in combination with at least one additional compatible impact modifier.

According to a principal aspect of the invention the process for producing an impact modified thermoplastic composition comprises blending
(a) a compatible resin composition comprising
(i) at least one polyphenylene ether resin, alone, or in combination with a polystyrene resin:
(ii) at least one poly(alkylene dicarboxylate) resin, the weight ratio component of (i) to component (ii) being at most 1.5:1 and
(iii) at least one polymer containing a substantial amount of aromatic polycarbonate units, alone, or in combination with a styrene homopolymer; and an effective amount for enhanced impact strength of (b) an impact modifier comprising an EPDM terpolymer grafted with glycidyl methacrylate or glycidyl acrylate or a mixture thereof, alone, or grafted in further combination with a $C_1-C_{18}$ alkyl methacrylate or acrylate or a mixture thereof, alone or in combination with at least one additional compatible impact modifier.

In especially preferred features, the present invention contemplates compositions wherein component (a)(i) comprises from about 15 to about 45 percent by weight; component (a)(ii) comprises from about 15 to about 45 percent by weight; component (a)(iii) comprises from about 3 to about 50 percent by weight; and component (b) comprises from about 8 to about 25 percent by weight, all percentage proportions being based on the weight of the total resinous components in the composition.

It is not certain whether any or all of the components in these compositions interact chemically upon blending. Therefore, the invention includes compositions comprising said components and any reaction products thereof, as well as other optional components described hereinafter.

Also preferred herein is a composition as defined above wherein the EPDM-glycidyl ether grafted terpolymer is present in an amount of, approximately, 10 to 20 percent by weight based on the total resinous components of the composition. Special mention is made of articles blow-molded from the compositions of this invention.

DETAILED DESCRIPTION OF THE INVENTION

The polyphenylene ethers (also known as polyphenylene oxides) used as all or part of component (a)(i) in the present invention comprise a plurality of structural units having the formula

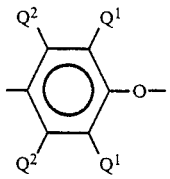

In each of said units independently each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units.

Also included are polyphenylene ethers containing groups which modify properties such as molecular weight, melt viscosity and/or impact strength. Such polymers may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted groups. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example in U.S. Pat. Nos. 3,306,874, 3,306,875, 3,914,266 and 4,028,341. They are usually combinations of cuprous or cupric ions, halide (i.e., chloride, bromide, or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating diamines, o-hydroxyoximes (monomeric and polymeric), o-hydroxyaryl oximes and beta diketones. Also useful are known cobalt-containing catalyst systems. Suitable manganese and cobalt-containing catalyst systems from polyphenylene ether preparation are known in the art.

The polyphenylene ethers which may be used in the invention include those which comprise molecules having at least one of the end groups of the formulas

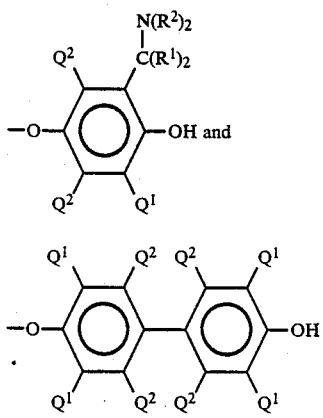

wherein $Q^1$ and $Q^2$ are previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide type intermediate of the formula

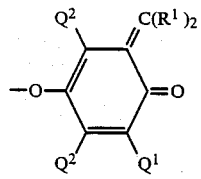

with numerous beneficial effects often including an increase in impact strength and compatibilization with other blend components.

Polymers with 4-hydroxybiphenyl end groups of formula III are typically obtained from reaction mixtures in which a by-product diphenoquinone of the formula

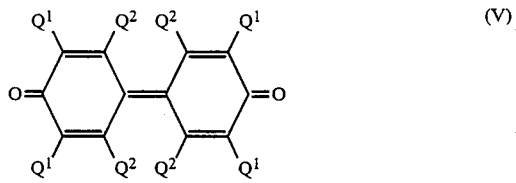

is present, especially in a copper-halide-secondary or tertiary amine system. In this regard, the disclosure of U.S. Pat. No. 4,477,649 is pertinent. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of polyphenylene ethers containing substantial amounts of unneutralized amino nitrogen may, under certain conditions, afford compositions with undesirably low impact strengths. The amino compounds include, in addition to the aminoalkyl end groups, traces of amine (particularly secondary amine) in the catalyst used to form the polyphenylene ether.

It has further been found that the properties of the compositions can often be improved in several respects, particularly impact strength, by removing or inactivating a substantial proportion of the amino compounds in the polyphenylene ether. Polymers so treated are sometimes refered to hereinafter as "inactivated polyphenylene ethers." They preferably contain unneutralized amino nitrogen, if any, in amounts no greater than 800 ppm. and more preferably in the range of about 200–800 ppm. Various means for inactivation have been developed and any one or more thereof may be used.

One such method is to precompound the polyphenylene ether with at least one non-volatile compound containing a carboxylic acid, acid anydride or ester group, which is capable of neutralizing the amine compounds. This method is of particular interest in the preparation of compositions of this invention having high resistance to heat distortion. Illustrative acids, anhydrides and esters are citric acid, maleic acid, agaricic acid, succinic acid, succinic anhydride, maleic acid, maleic anhyride, citraconic acid, citraconic anhydride, itaconic acid, itaconic anhydride, fumaric acid, diethyl maleate and dimethyl fumarate. Because of their relatively high reactivity with amino compounds, the free carboxylic acids and especially fumaric acid are generally most useful.

Reaction of the polyphenylene ether with the acid or anhydride may be achieved by heating at a temperature within the range of about 230°–390° C., in solution or preferably in the melt. In general, about 0.3–2.0 and preferably about 0.5–1.5 part (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of drawing a vacuum of about 20 torr or less.

It is believed that these inactivation methods aid in the removal by evaporation or the neutralization of any traces of free amines generated by conversion of minoalkyl end groups to quinone methides of the type represented by formula IV. Polyphenylene ethers having a free amine nitrogen content below about 600 ppm. have been found particularly useful in this invention. However, the invention is not dependent on any theory of inactivation.

The preparation of inactivated polyphenylene ethers by reaction with acids or anhydrides, together with vacuum during extrusion, is illustrated by the following Procedures. All parts in the procedures are are by weight.

PROCEDURE A

A mixture of 1.43 parts of maleic anhydride and 100 parts of a poly-(2,6-dimethyl-1,4-phenylene ether) having a number average molecular weight (as determined by gel permeation chromatography) of about 20,000 and an intrinsic viscosity in chloroform at 25° C. of 0.46 dl/g is tumble-mixed for 15-30 minutes and then extruded on a 20 mm. twin screw extruder at 400 rpm over a temperature range of about 310°-325° C. The feed rate of the mixture is about 524 grams per 10 minutes. The extruder is vacuum vented with a vacuum pump to a pressure less than 20 torr during the extrusion. The product is the desired inactivated polyphenylene ether.

PROCEDURES B-E

The procedure of Procedure A is repeated, substituting 0.78, 0.8, 1.0 and 1.4 parts, respectively, of fumaric acid for the maleic anhydride and extruding over a temperature range of about 300°-325° C. A similar product is obtained.

PROCEDURE E

Procedure B was repeated, substituting 0.7 part of citric acid for the fumaric acid. A similar product is obtained.

Component (a)(i) may also contain at least one polystyrene. The term "polystyrene" as used herein includes polymers prepared by methods known in the art including bulk, suspension and emulsion polymerization, which contain at least 25% of weight of structural units derived from a monomer of the formula

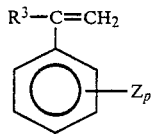

(VI)

wherein $R^3$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, alpha-methylstryene, ethylyinylbenzene, divinylbenzene and maleic anhydride, and rubber-modified polystyrenes comprising blends and grafts, wherein the rubber is a polybutadiene or a rubbery copolymer of about 98-70% styrene and about 2-30% diene monomer. These rubber-modified polystyrenes include rubber-modified high impact polystyrene, or HIPS.

The proportion of polystyrene in component (a) (i) is not critical, since polyphenylene ethers and polystyrenes are miscible in all proportions. Component (a)(iii) will generally contain about 5-50% (by weight) polystyrene, if any.

Component (a)(ii) comprises at least one linear polyester. The linear polyesters include thermoplastic poly-(alkylene dicarboxylates) and alicyclic analogs thereof. They typically comprise structural units of the formula

(VIII)

wherein $R^4$ is a saturated divalent aliphatic or alicyclic hydrocarbon radical containing about 2-10 and usually about 2-6 carbon atoms and $A^1$ is a divalent aromatic radical containing about 6-20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art are illustrated by U.S. Pat. Nos. 2,465,319; 2,720,502; 2,727,881; 2,822,348; 3,047,539; 3,671,487; 3,953,394; 4,128,526, etc. Because of the tendency of polyesters to undergo hydrolytic degradation at the high extrusion and molding temperatures encountered by the compositions of this invention, it is preferred that the polyester used as component (a)(ii) be substantially free of water.

The polyesters generally have number average molecular weights in the range of about 20,000-70,000, as determined by intrinsic viscosity (IV) at 30° C. in a mixture of 60% (by weight) phenol and 40% 1,1,2,2-tetrachloroethane. When resistance to heat distortion is an important factor the polyester molecular weight should be relatively high, typically above about 40,000.

Because of the presence of both poly(alkylene dicarboxylates) and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01-7.5% by weight of total polyester. It is generally preferred to precompound said exchange suppressing agent with the polyester, since it is frequently found that the impact strengths of the compositions of this invention are substantially decreased if the exchange suppressing agent is incorporated directly therein. Precompounding may be achieved by direct blending or by forming a concentrate typically with about 1-25% by weight of the polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290.

According to the present invention, the tendency of blends of components (a)(i) and (a)(ii) to be incompatible is overcome by incorporating component (a)(iii) in the composition. The essential ingredient of component (a)(iii) is a polymer containing a substantial proportion of aromatic polycarbonate units.

Among the preferred polymers of this type are the aromatic polycarbonate homopolymers. The structural units in such homopolymers generally have the formula

(VIIIa)

wherein $A^2$ is an aromatic radical. Suitable $A^2$ values include m-phenylene, p-phenylene, 4,4'-biphenylene, 2,2-bis(4-phenylene)propane, 2,2-bis(3,5-dimethyl-4-phenylene)propane and similar radicals such as those which correspond to the dihydroxyaromatic compounds disclosed by name or formula (generic or specific) in U.S. Pat. No. 4,217,438. Also included are radicals containing nonhydrocarbon groups. These may be sustituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula

(IX)

wherein each of $A^3$ and $A^4$ is a single-ring divalent aromatic radical and Y is a bridging radical in which one or two atoms separate $A^3$ from $A^4$. The free valence bonds in formula IX are usually in the meta or para positions of $A^3$ and $A^4$ in relation to Y. Such $A^2$ values may be considered as being derived from bisphenols of he formula $HO-A^3-Y-A^4-OH$. Frequent reference to bisphenols will be made hereinafter, but it should be understood that $A^2$ values derived from suitable compounds other than bisphenols may be employed as appropriate.

In formula IX, the $A^3$ and $A^4$ values may be unsubstituted phenylene or substituted derivatives thereof, illustrative substituents (one or more) being alkyl, alkenyl (e.g., crosslinkable-graftable groups such as vinyl and alkyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cyclohexylmethylene, 2-[2.2.1]-bicycloheptylmethylene, ethylene, 2,2-propylene, 1,1-(2,2-dimethylpropylene)-1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichlorethylidene, carbon, thio and sulfone. For reasons of availability and particular suitability for the purposes of this invention, the preferred radical of formula VIII is the 2,2-bis(4 phenylene)-propane radical, which is derived from bisphenol A and in which Y is isopropylidene and $A^3$ and $A^4$ are each p-phenylene.

Various methods of preparing polycarbonate homopolymers are known, and any of them may be used for preparing component (a)(iii). They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in European Patent Application No. 162,379 and in copending, commonly owned applications Ser. No. 704,122, filed Feb. 22, 1985, and Ser. No. 723,672, filed Apr. 16, 1985.

Various copolycarbonates are also useful as component (a)(iii). One example thereof is the polyester polycarbonates of the type obtained by the reaction of at lest one dihydroxyaromatic compound with a mixture of phosgene and at least one dicarboxylic acid chloride, especially isophthaloyl chloride, terephthaloyl chloride or both. Such polyester-polycarbonates contain structural units of formula VIII combined with units of the formula

(X)

wherein $A^5$ is an aromatic and usually a p- or m-phenylene radical. Other examples are the siloxane-carbonate block copolymers disclosed, for example, in U.S. Pat. Nos. 3,189,662 and 3,419,634, and the polyphenylene etherpolycarbonate block copolymers of U.S. Pat. Nos. 4,374,223 and 4,436,876, which frequently provide compositions with substantially higher heat distortion temperatures than those containing homopolycarbonates.

The copolycarbonates should, for the most part contain at least about 20% by weight of carbonate structural units. When the copolymeric units are other than ester units, the polymer preferably contains at least about 45% carbonate units.

The weight average molecular weight of the homo or copolycarbonate should be at least about 40,000 (as determined by gel permeation chromatography relative to polystyrene) for maximum impact strength. It is most often in the range of about 40,000–80,000 and especially about 50,000–80,000. However, compositions in which component (a)(iii) has a molecular weight in the range of about 80,000–200,000 often have very high impact strengths, as noted hereinafter.

In most instances, component (a)(iii) consists of the polycarbonate or copolycarbonate, that is, said polymer is the entire component except for impurities. It is within the scope of the invention, however, to use as component (a)(iii) a blend of a polycarbonate or polyester-polycarbonate with a styrene homopolymer, typically having a number average molecular weight of about 50,000–250,000. Such blends generally contain at least 50% of the polycarbonate or polyester-polycarbonate.

It will be noted that various polystyrenes may be used in the invention as all or part of components (a)(i), and (a)(iii). However, the specific polystyrenes used are different in various respects. The polystyrene in component (a)(i) is a homopolymer, random copolymer or rubber-modified polystyrene; and homopolymers are used in component (a)(iii). Moreover, polystyrenes are ordinarily present in only one of components (a)(i) and (a)(iii), if in either.

It is also within the scope of the invention to employ a polyester-aromatic polycarbonate blend as a source of part or all of components (a)(ii) and (a) (iii). The use of such a blend may provide somewhat more flexibility in component proportions.

The glycidyl ester grafted terpolymer additives used as component (b) of this invention may be prepared from any of the well known EPDM terpolmer rubbers. EPDM terpolymers useful for preparing the grafted materials used in the invention are commercially available, e.g., Copolymer Corp. (EPSYN® 55), or may be prepared using a Ziegler-type catalyst. The preparation of typical EPDM terpolymers is described, for example, in Gresham et al., U.S. Pat. No. 2,933,480; Tarney, U.S. Pat. No. 3,000,866; Guglielmino et al., U.S. Pat. No. 3,407,158; Gladding, U.S. Pat. No. 3,093,621 and U.S. Pat. No. 3,379,701. These terpolymers are characterized by the absence of chain or backbone unsaturation and the presence of sites of unsaturation in groups which are pendant to or are in cyclic structures outside of the main polymer chain.

Useful EPDM terpolymers for the production of the glycidyl ether grafted terpolymers used in this invention comprise ethylene, a $C_3$ to $C_{16}$ straight or branched chain alpha-olefin, preferably propylene, and a nonconjugated diolefin. Satisfactory nonconjugated dienes that may be used as the third monomer in the terpolymer include straight chain dienes such as 1,4-hexadiene, cyclic dienes such as cyclo-octadiene and bridged cyclic dienes such as ethylidene norbornene.

Preferred EPDM terpolymers are comprised of about 10–95, preferably 45–70 mole percent, by weight ethylene, about 5 to 90, preferably 30–55 mole percent polypropylene and a minor amount of diene monomer, most preferably a poly-unsaturated bridged ring hydrocarbon of halogenated derivative thereof, most preferably 5-ethylidene-2-norbornene. These EPDM terpolymers have a melt index of approximately 79 g/10 min, a Mooney viscosity of approximately 78 and a gram molecular weight of about 21,600.

The backbone rubber is subsequently graft modified with a graft monomer of expoxy functional acrylate or methacrylate. Although grafting may occur by various reaction mechanisms at practically any point on the backbone rubber, generally, the grafting takes place at an unreacted point of unsaturation on the polyene. For this reason, it is desirable to make use of an ethylene, mono-olefin, polyene backbone rubber having at least two unsaturated carbon-to-carbon linkages per 100 carbon atoms and little additional benefit is derived from the use of unsaturated backbone rubber having more than 20 carbon-to-carbon double bonds per 1000 carbon atoms. In the preferred practice of this invention, use is made of an unsaturated rubber having from 4–10 carbon-to-carbon double bonds per 1000 carbon atoms.

The point of ethylenic unsaturation on the epoxy functional graft monomer must be sufficiently reactive to react directly with the unsaturation of the polyene; or to react with a graft chain originating at, or for combination with, the polyene unsaturation. Such levels of reactivity require the alpha-beta situation of the ethylenic unsaturation as found in, for example, an epoxy functional esters of acrylic acid or alkyl acrylic acid. A free radical initiator, such as a dialkyl peroxide may be used to promote the graft reaction. Such initiator is generally used in an amount within the range of 1–5 parts per 100 parts by weight of the unsaturated rubber, and preferably in an amount within the range of 1–2 percent by weight.

Preferred as the graft monomer herein is glycidyl methacrylate (GMA).

The graft chain formed by the grafting process on the backbone rubber need not be a homopolymer or even be of entirely epoxy functional graft monomers. For example, combinations of the two above-mentioned epoxy functional graft monomers may be used as well as combinations of either or both with other $C_1$–$C_{18}$ alkyl acrylates or methacrylates, wherein $C_1$–$C_8$ may be straight chain or branched, e.g., methyl, ethyl, isopropyl, 2-ethyl-hexyl, decyl, n-octodecyl, and the like. Particularly useful such comonomer grafts are grafts of glycidyl acrylate and/or glycidyl methacrylate and methyl methacrylate.

It is preferred in the present invention that the gel content of the elastomeric material be controlled either during polymerization or in subsequent processing to achieve a value of greater than about 10% by weight and less than 80%. With a gel content too low impact strength is high, but knit line strength is low. With a gel content too high, both impact strength and knit line strength are low.

Gel content in an especially convenient analysis, according to ASTM D-3616, is measured by the weight percent of remaining elastomeric material after extraction in hexane or toluene. Gel content is an indication of the degree of cross-linking in the elastomeric material. Of course, persons skilled in the art are familiar with a variety of ways to control the degree of cross-linking and thus the gel content can be determined by numerous other methods. The cross-link reaction may be a direct rubber backbone to rubber backbone joining, an epoxy functionality to epoxy functionality or rubber backbone joining, or a graft chain free radical additional to a second graft chain or to a rubber backbone. Further, cross-linking may be achieved by the addition of a cross-linking agent to effectively achieve any of the above reactions. Thus, any of several steps to control gel content may be taken. Thermal aging will increase gel content. Increasing the amount of epoxy functional graft monomer will increase gel content. Increasing the amount of polyene monomer in the rubber backbone will increase gel content. The addition of a cross-linking agent will increase gel content. The use of graft monomers with greater tendency to cross-link will increase gel content, for example, a homopolymer graft of glycidyl acrylate will cross-link more readily than a homopolymer graft of glycidyl methacrylate or a copolymer graft of glycidyl acrylate and methyl methacrylate.

As stated above, gel content of the elastomeric material used in this invention should range up to no higher than about 80%. Although cross-linking can be carried on well past this level, as has been mentioned, high levels of cross-linking diminish the dispersibility of the elastomeric material and lead to non-uniform mixing. Also, such high levels of localized cross-linking will create brittle areas within the elastomeric material which will decrease rubbery character. It is apparent that cross-links should be uniformly dispersed throughout the elastomeric material.

It is preferred in the present invention that the elastomeric material have an epoxy functionality of at least 2.5 epoxy functionalities per 1000 carbon atoms, and preferably between about 5.0 and 13 epoxy functionalities per 1000 carbon atoms. Epoxy functionality means those epoxy sites which remain in the impact modifier resin after the loss of such functionalities as may react in the cross-linking reaction. In the instance of the use of GMA or GA as the epoxy functional graft monomer, a graft level of above about 1% by weight is preferred to provide the minimum level of epoxy as shown above. The maximum is not particularly critical, e.g., up to 1–15% by weight can be used, although about 6% is convenient.

The grafting reaction may be carried out in solvent solution with the unsaturated rubber backbone present in a concentration which may range from 10–30 percent by weight, with constant stirring, at an elevated temperature within the range of 125°–200° C. for a time ranging from ½ to 2 hours. The reaction condition can be varied depending somewhat upon the type and amount of catalyst and temperature conditions, as is well known to those skilled in the art. Where high amounts of graft monomer are to be attached to the backbone rubber, it has been found to be advantageous to carry out the graft reaction in the melt state of the backbone rubber, i.e., extruder grafting. This process is simply performed by feeding the backbone, rubber, an excess of graft monomer, and an appropriate catalyst to a melt extruder and mixing and reacting the feed components at an elevated temperature.

Component (b) can, in addition, include at least one additional elastomeric compatible impact modifier. Suitable additional impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; block copolymers of alkenylaromatic compounds such as styrene with polymerizable olefins or dienes, including butadiene, isoprene, chloroprene, ethylene, propylene and butylene; and core-shell elastomers containing, for example, a poly(alkyl acrylate) core attached to a polystyrene shell via an interpenetrating network. Such core-shell elastomers are more fully disclosed in copending, commonly owned application Ser. No. 811,800, filed Dec. 20, 1985.

The preferred second impact modifiers, if used, are block (typically diblock, triblock or radial teleblock) copolymers of alkenylaromatic compounds and dienes. Most often, at least one block is derived from styrene and at least one other block from at least one of butadiene and isoprene. Especially preferred are the triblock copolymers with polystyrene end blocks and diene-derived midblocks. It is frequently advantageous to remove (preferably) or reduce the aliphatic unsaturation therein by selective hydrogenation. The weight average molecular weights of the additional impact modifiers are tyically in the range of about 50,000–300,000. Block copolymers of this type are commercialy available from Shell Chemical Company under the trademark KRATON, and include KRATON D1101, G1650, G1652, G1657 and G1702.

In general, the amount of impact modifiers in the case where two are used will be in the range of 90 to 10 parts of the former to, correspondingly, 10 to 90 parts of the latter, by weight.

Particularly in compositions containing inactivated polyphenylene ethers and relatively small amounts of polycarbonate, it is frequently found that impact strength and/or resistance to heat distortion are improved if there is also blended into the composition at least on compound (c) selected from those containing at least one cyanurate or isocyanurate group and those containing a plurality of epoxide groups. Illustrative cyanurates and isocyanurates are cyanuric chloride, triethyl cyanurate, triallyl cyanurate, triallyl isocyanurate and triphenyl cyanurate. Epoxide compounds include homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

In various respects, the proportions of ingredients in the compositions of this invention are variable over a broad range. However, it is generally preferred that components (a)(i) and (a)(ii) will each be present in the compositions described hereinabove in the amount of about 10–45%, most preferably about 15–45% of total resinous components. Moreover, the weight ratio of component (a)(i) to component (a)(ii) should be at most 1.5:1, since if component (a)(i) is present in greater amounts the impact strength of the composition may decrease sharply. Said weight ratio is preferably about 0.7–1.0:1.

Component (b), the elastomeric impact modifier, may be present in a widely varying amount, but is preferably present in the amount of about 8–25% and especially about 10–20%. Since a decrease in the proportion of component (b) frequently increases heat distortion temperature, the level thereof should be minimized if high resistance to heat distortion is desired.

With respect to the proportion of component (a)(iii), the compatibilizing polymer, the invention specifically prefers three major embodiments although species outside these embodiments are also contemplated. The first embodiment includes polymers containing about 10–40% of component (a)(iii). In such compositions, component (a)(i) is typically a polyphenylene ether which has not been inactivated. In most instances, levels of components (a)(i), (a)(ii) and (a)(iii) of about 15–35%, 15–35% and 20–40% (respectively) are preferred in such compositions for maximum impact strength.

When component (a)(i) is not inactivated and components (a)(ii) and (a)(iii) are supplied in full or in part by a polyester-aromatic polycarbonate blend, it is frequently possible to attain the desired high impact strengths by using proportions of certain components outside of those previously described. This is true in at least two respects; the possibility of using a lower proportion of component (a)(ii) with respect to component (a)(i), and of employing more than 40% of component (a)(iii). Thus, another aspect of the present invention is compositions comprising the following components and any reaction products thereof: about 15–35% of polyphenylene ether as component (a)(i) about 10–35% of component (a)(ii), about 10–25% of component (b) and from 12% to about 50% of at least one aromatic polycarbonate as component (a)(iii), with the provisos that all of component (a)(ii) and at least about 60% of component (a)(iii) are supplied as a poly(alkylene dicarboxylate)-aromatic polycarbonate blend, and that the weight ratio of component (a)(i) to component (a)(ii) is at most about 1.8:1 and preferably about 0.7–1.8:1.

In the second embodiment, component (a)(i) is an inactivated polyphenylene ether and the proportions of components (a)(i) and (a)(ii) are each about 30-45%. The proportion of component (a)(iii) is about 3-10% and the blend may also include component (c) in the amount of about 0.1-3.0 and preferably at least about 0.25 part per 100 parts of total components (a)(i), (a)(ii), (a)(iii) and (b). This embodiment is often characterized by relatively high heat distortion temperatures.

It is within the scope of this second embodiment to introduce component (c) by blending with the other components in a single blending operation. However, it is often preferred to premix component (c) with component (a)(ii), typically by dry mixing followed by preextrusion. Such premixing increases the melt viscosity of component (a)(ii), probably by increasing molecular weight, and frequently also increases the impact strength of the composition of the invention.

In the third embodiment, component (a)(i) is an inactivated polyphenylene ether and the polycarbonate has a weight average molecular weight in the range of about 80,000-200,000, preferably about 150,000-200,000. Compositions in which these polycarbonates and other components are present in the same proportions as in the second embodiment are generally characterized by high impact strengths even when component (c) is absent.

The chemical roles of the inactivated polyphenylene ether and of component (c) in the compositions of this invention are not fully understood, and any reliance on chemical theory as a basis for the invention is specifically disclaimed. It is believed, however, that the presence of more than a certain minimum proportion of amino compound in the polyphenylene ether can cause degradation in the molecular weight of the polycarbonate. Such amino compounds include, in addition to the aminoalkyl end groups, traces of amines (particularly secondary amine) in the catalyst used to removal or neutralization of the greater part of such amino compounds produces an environment in which high molecular weight is maintained in the polycarbonate, thus maximizing its effect as a compatibilizing agent.

The compositions of this invention have been shown by scanning electron microscopy to consist essentially of particles of polyphenylene ether (component (a)(i)) dispersed in a continuous polyester containing phase. The size and shape of said particles varies with such factors as the proportion of polyphenylene ether in the composition. The elastomeric impact modifier (component (b)) is present substantially entirely in the continuous phase.

It is within the scope of the invention for the composition to contain other conventional ingredients such as fillers, flame retardants, pigments, dyes, stabilizers, antistatic agents, mold release agents and the like. The presence of other resinous components is also contemplated.

The preparation of the compositions of this invention is normally achieved by merely blending the ingredients thereof under conditions adapted for the formation of an intimate blend. Such conditions often include extrusion, which may be conveniently effected in a screw type or similar extruder which applies a substantial shearing force to the composition, thereby decreasing the particle size thereof. The extrusion temperature is generally in the range of about 100°-325° C.

The extrusion conditions may affect the impact strength and other properties of the composition. For example, it is sometimes found that the impact strength of the composition is increased if it is extruded more than once, thereby insuring effective blending.

In another embodiment, a single extruder is employed which has at least two ports for introduction of ingredients, one such port being downstream from the other. Component (a)(i) or any reactants for preparation thereof and at least a portion of component (b) are introduced through the first port and extruded, preferably at a temperature in the range of about 300°-350° C. This portion of the extruder is preferably vacuum vented.

The remaining ingredients are introduced through the down stream port and extrusion is continued, preferably at a temperature in the range of about 300°-350° C. This portion of the extruder is preferably vacuum vented.

The remaining ingredients are introduced through the downstream port and extrusion is continued, preferably at a lower temperature to minimize degradation of components (a)(ii) and (a)(iii). For further minimization of degradation, it may be advantageous to introduce a portion of component (b) at this point. Typical extrusion temperatures at this stage are in the range of about 240°-320° C.

DESCRIPTION OF THE PREFERRED EMBODIMENTS

The following examples illustrate the invention. The claims are not to be limited by them in any manner, whatsoever.

In the examples the following designations are used to denote the materials and physical tests employed:

| | PHYSICAL TESTS |
|---|---|
| Heat Deflection Temperature/HDT | ASTM D-648, 66 psi |
| Notched Izod Impact n. Izod | ASTM D-256 |
| Flexural Strength | ASTM D-790 |
| Flexural Modulus | ASTM D-790 |
| Tensile Strength | ASTM D-638 |
| Tensile Elongation | ASTM D-638 |
| INGREDIENTS FOR COMPONENT (b) | |
| Backbone Rubber A (EPDM A) | EPSYN ® 4906 resin; EPDM rubber; 2.2 RSV; 9C=C/1000 C (8% by weight of polyene 5-ethylidene-2-norbornene); ethylene/propylene ratio = 2/1; Mooney viscosity = 40; Copolymer Rubber & Chemical Corp. |
| Backbone Rubber B (EPDM B) | EPSYN ® 55 resin; EPDM rubber; 2.3 RSV; 9C=C/1000 C (8% by weight of polyene 5-ethylidene-2-norbornene); ethylene/propylene ratio = 2/1; Mooney Viscosity = 50; Copolymer Chemical & Rubber Corp. |
| Backbone Rubber C (EPDM C) | EPSYN ® E901 resin; EPDM rubber; 2.2 RSV; 45 C=C/1000 C (4% by eight of polyene 5-ethylidene-2-norbornene); E/P ratio 4/1; Mooney viscosity = 50; Copolymer Rubber & Chemical Corp. |
| Antioxidant | IRGANOX ® 1076 phenolic antioxidant; Ciba Geigy Corporation |
| Initiator A | Hercules Di-Cup ® free radical initiator; dicumyl peroxide |
| Initiator B | 2,5-dimethyl-2,5-di(t-butylperoxy) hexane |
| Poly(1,4-butylene terephthalate)/PBT | VALOX 315 resin; General Electric Company |

Also in these examples, the following abbreviations are used:

PPO—a poly(2,6-dimethyl-1,4-phenylene ether) having a number average molecular weight of about 20,000 and an intrinsic vicosity in chloroform at 25° C. of 0.4 dl/g; it was found to contain about 1000 ppm. nitrogen.

PPO-FA—PPO functionalized by melt processing with 1% by weight of fumaric acid.

PBT—poly(butylene terephthalates) (General Electric Co. VALOX ® 315 resin).

PC—bisphenol A homopolycarbonate prepared interfacially (General Electric LEXAN ® ML 4735 resin) and LEXAN ®131 resin.

EPM—ethylene-propylene copolymer

EPDM—ethylene-propylene-diene terpolymer

GMA—glycidyl methacrylate

GA—glycidyl acrylate

MMA—methyl methacrylate

EPDM-G-GMA—EPDM grafted with glycidyl methacrylate

EPDM-G-GA—EPDM grafted with glycidyl acrylate

PML—Melt Processed Blend of PBT and EPDM-G-GMA (4:1)

SEBS—a commercially available triblock copolymer with polystyrene end blocks having weight average molecular weights of 29,000 and a hydrogenated butadiene midblock having a weight average molecular weight of 116,000 (KRATON ®-1651, Shell Chemical Co.).

EXAMPLE 1

(a) Formulations of monomer grafted EPDM resin are prepared as follows: 100 weight parts of backbone rubber A; 0.1 weight parts of hexane are charged to a one gallon Hastelloy C reactor. The reactor is sealed, flushed with $N_2$, and heated to 155° C. Sufficient weight parts of GMA monomer to give 6 parts of graft on 100 parts of rubber in approximately 15 weight parts hexane are metered into the reactor. This is followed by 2 weight parts of initiator A in approximately 15 weight parts of hexane. The solution is stirred at 500–600 rpm for one hour at 155° C. and 200–250 psi. After the reaction mixture has cooled down, the EPDM-g-GMA is recovered by precipitation in acetone followed by drying overnight at 75° C. under pump vacuum.

(b) A thermoplastic composition comprising 4 parts by weight of poly(1,4-butylene terephthalate) (PBT), and one part of the rubber grafted material prepared in step (a) are extruded once on a single screw extruder. Zone temperatures are 250° C., the die temperature is 240° C. and screw speed is 150 rpm. The water cooled strands of material (PML) are cut into pellets.

(c) A composition according to the invention is prepared by tumble mixing the ingredients in a jar mill for ½ hour and extruding at 120°–287° C. on a twin screw extruder with a screw speed of 400 rpm. The extrudate is quenched in water and pelletized. The pellets are then injection molded into test bars which were evaluated for notched Izod impact strength, flexural and tensile strength, elongation, modulus and Dynatup impact strength. For control purposes a composition eliminating the EPDM-g-GMA and substituting SEBS is made and tested. The compositions used and the results obtained are set forth in Table 1:

TABLE 1

Composition Comprising Polyphenylene Ether Poly(1,4-butylene terephthalate), Poly(Bisphenol-A Carbonate) and EPDM-grafted-Glycidyl Methacrylate

| Composition (parts by weight) | | | 1A* | 1 |
|---|---|---|---|---|
| (a) (i) | Poly(2,6-dimethyl-1,4-phenylene ether)(PPO) | | 30 | 30 |
| (a) (ii) | Poly(1,4-butylene terephthlate) (PBT)** | | 46 | 36.8 |
| (a) (iii) | Poly(bisphenol A carbonate) | | 8 | 8 |
| (b) | EPDM-g-GMA | | — | 9.2 |
| | SEBS(KG1651) | | 16 | 8 |
| | Antioxidant(IRGANOX ® 1010) | | 0.2 | 0.2 |
| Properties | | | | |
| Heat Distortion Temp., F. | | | 305 | 324 |
| Notched Izod Impact | | | | |
| ft lbs./in.n. 72° F. | | | 17 | 16 |
| −20° F. | | | 5 | 13 |
| Flexural Modulus, kpsi | | | 264 | 263 |
| Flexural Strength, kpsi | | | 10.0 | 9.5 |
| Tensile yield, kpsi | | | 5.7 | 5.6 |
| Tensile strength, kpsi | | | 5.4 | 5.2 |
| Tensile elongation, % | | | 42 | 87 |
| Dynatup impact | | | | |
| ft-lbs. 72° F. | | | 37 | 35 |
| −20° F. | | | 50 | 48 |

*Control
**Example 1, 36.8 parts in PML form.

The fractured Izod Test bars were inspected for delamination, and none was detected.

The results indicate that the composition according to this invention unexpectedly retains a substantial amount of its impact resistance, even at low temperatures, when compared with the control.

EXAMPLES 2-4

The procedure of Example 1 is repeated, omitting the SEBS as second impact modifier and replacing part of the PML preextruded PBT-EPDM-g-GMA Composition with PBT resin. The formulations used and the physical properties obtained on injection molded parts are set forth in Table 2:

TABLE 2

Compositions comprising Polyphenylene Ether, Poly(1,4-Butylene Terephthalate), Poly(Bisphenol-A Carbonate) and EPDM-grafted-Glycidyl Methacrylate

| EXAMPLE Composition (parts by weight) | 2 | 3 | 4 |
|---|---|---|---|
| (a)(i) Poly(2,6-dimethyl-1,4-phenylene ether) | 30 | 30 | 30 |
| (a)(ii) Poly(1,4-butylene terephthalate)* | 36.8 | 42.2 | 52.2 |
| (a)(iii) Poly (Bisphenol A-carbonate) | 8 | 8 | 8 |
| (b) EPDM-g-GMA (6% GMA) (Example 1, step (a)) | 9.2 | 5.8 | 5.8 |
| Antioxidant, IRGANOX 1010 | 0.2 | 0.2 | 0.2 |
| PROPERTIES | | | |
| Heat Distortion Temp., °F. | 312 | 314 | 310 |
| Notched Izod Impact | | | |
| ft-lbs/in notch 72° F. | 16 | 12 | 2.8 |
| Flexural Modulus, kpsi | 244 | 267 | 277 |
| Flexural Strength, kpsi | 9.2 | 10.0 | 11.0 |
| Tensile yield, kpsi | 5.4 | 7.1 | 7.5 |
| Tensile strength, kpsi | 5.9 | 6.2 | 6.2 |
| Tensile elongation, % | 50 | 28 | 31 |
| Dynatup impact ft-lbs | | | |
| 72° F. | 35 | 40 | 43 |
| −20° F. | 41 | 45 | 40 |

*Example 2, 336.8 parts in PML form; Example 3, 233.2 parts in PML form; Example 4, 23.2 parts in PML form.

The foregoing results show that the EPDM-g-GMA is an extremely effective impact modifier even without SEBS in the composition.

EXAMPLE 5

The procedure of Example 1 is repeated, using a PPO functionalized with fumaric acid. The formulation used and the test results obtained after molding are set forth in Table 3.

TABLE 3

Compositions Comprising FA-functionalized Poly(2,6-Dimethyl 1,4-phenylene Ether), Poly(1,4-Butylene Terephthalate), Poly(Bisphenol-A Carbonate) and EPDM - grafted - Glycidyl Methacrylate

| EXAMPLE | 5 |
|---|---|
| Composition (parts by weight) | |
| (a)(i) Poly(2,6-dimethyl-1,4 phenylene ether) | 30 |
| (a)(ii) Poly(1,4-butylene terephthalate) | 46.4 |
| (a)(iii) Poly(Bisphenol-A carbonate) | 8 |
| (b) EPDM-g-GMA (6% GMA) (Example 1, step (a)) | 11.6 |
| Fumaric Acid | 0.3 |
| Antioxidant, IRGANOX ® 1010 | 0.2 |
| PROPERTIES | |
| Heat Distortion Temp., °F. | 318 |
| Notched Izod Impact ft-lbs/in notch | 15 |
| Flexural Modulus, kpsi | 236 |
| Flexural Strength, kpsi | 9.3 |
| Tensile Yield, kpsi | 6.2 |
| Tensile Elongation, % | 29 |
| Tensile Strength, Kpsi | 5.8 |
| Dynatup Impact, ft-lbs | |
| 72° F. | 36 |
| −20° F. | 45 |

EXAMPLES 6 AND 7

Impact modified compositions according to this invention are made by extruding dry blends of poly(1,4-butylene terephthalate), poly(2,6-dimethyl-1,4-phenylene ether), poly(bisphenol-A carbonate) and glycidyl methacrylate-grafted ethylene-propylene-diene rubber. In one case, the GMA grafted rubber was partially replaced with styrene-ethylene-butylene-styrene block copolymer rubber. In a control, the GMA-grafted EPDM was omitted. The compositions were then injection molded and tested. The formulations used and the results obtained are set forth in Table 4.

TABLE 5

Compositions Comprising Poly(2,6-Dimethyl-1,4 phenylene Ether), Poly(1,4-Butylene Terephthalate), Poly(Bisphenol-A Carbonate) and EPDM-grafted-Glycidyl Methacrylate

| EXAMPLE | 6a* | 6 | 7 |
|---|---|---|---|
| Composition (parts by weight) | | | |
| (a)(i) Poly(2,6-dimethyl-1,4-phenylene ether), FA functionalized | 40.0 | 40.0 | 40 |
| (a)(ii) Poly(1,4-butylene terephthalate) | 38.8 | 38.8 | 38.8 |
| (a)(iii) Poly(Bisphenol-A Carbonate) | 8.0 | 8.0 | 8.0 |
| (b) EPDM-g-GMA (6% GMA) | 0 | 6.0 | 12 |
| SEBS Block Copolymer Rubber (KG-1651) | 12.0 | 6.0 | 1.0 |
| Stabilizers | 1.2 | 1.2 | 1.2 |
| PROPERTIES | | | |
| Notched Izod Impact | | | |
| ft-lbs/in notch | 7.3 | 5.6 | 2.46 |
| Biaxial Impact Energy, ft-lb | 28.3 | 26.3 | 15 |
| Melt Viscosity, poise | 213,000 | 348,000 | — |
| Spiral Flow (0.125 × )0.100 channel), in. | 6.7 | 5.7 | — |
| R*(Poise at 1 rad/sec) | 14.0 at 514° F. | 16.6 at 550° F. | | a*Control

The unexpectedly very shear sensitive viscosity of the composition of this invention as shown by R* values makes it ideal for extrusion and blow molding applications.

The above-mentioned patents, applications, publications and test methods are incorporated herein by reference.

Many variations of the present invention will suggest themselves to those skilled in this art in light of the above, detailed description. For example, instead of poly(2,6-dimethyl-1,4-phenylene ether), a poly(2,5-dimethyl-co-2,3,6-trimethyl-1,4-phenylene ether) can be used as component (a). A poly(1,4-butylene terephthalate) containing 0.036 by weight of $NaH_2PO_4$ as an exchange suppressing agent, poly(ethylene terephthalate) and poly(1,4-cyclohexane dimethylene terephthalate) can be used as all or part of component (a)(ii). Instead of the poly(bisphenol-A carbonate) as component (a)(iii), there can be used a 2,2-bis(3,5-dimethyl-4-hydroxyphenyl) propane polycarbonate; a block poly(2,6-dimethyl-1,4-phenylene ether) bisphenol A polycarbonate copolymer, a polyester carbonate made by reacting bisphenol-A with phosgene and a mixture of isophthaloyl chloride and terephthaloyl chloride, a block copolymer containing bisphenol-A polycarbonate units and poly(dimethylsiloxane) units, or a mixture of any of the polycarbonates or block copolymers and/or interpolymers, with styrene homopolymer. Instead of the SEBS, as additional impact modifiers, there can be used SBS, which is a triblock copolymer similar to SEBS but containing an unhydrogenated butadiene midblock; SB(H), which is a styrene-butadiene block is hydrogenated; SI(H), which is similar to SB(H) but in which a hydrogenated isoprene is present; and CS, which is a core-shell polymer with a poly(butyl acrylate) core and a polystyrene shell, connected via an interpenetrating network. Instead of the EPDM-g-GMA modifier, as component (b) there can be used an EPDM grafted with a mixture of glycidyl methacrylate and methyl methacrylate, a mixture of glycidyl acrylate and methyl methacrlate, or a mixture of glycidyl methacrylate and octadecyl methacrylate. Instead of injection molding, blow molding, including injection blow molding, can be used. All such obvious variations are within the full intended scope of the appended claims.

We claim:
1. An impact modified thermoplastic composition comprising the following various components and any reaction products thereof:
   (a) a compatible resin composition comprising (i) at least one polyphenylene ether resin, alone, or in combination with a polystyrene resin selected from the group consisting of a styrene homopolymer, a random copolymer of styrene and a rubber modified polystyrene; (ii) at least one poly(alkylene dicarboxylate) ratio of component (i) to component (ii) being at most 1.5:1; and (iii) at least one polymer containing a substantial proportion of aromatic polycarbonate units; and (b) an effective amount of an impact modifier comprising an EPDM terpolymer grafted with a compound selected from the group consisting of glycidyl methacrylate, glycidyl acrylate and a mixture thereof, alone, or grafted in further combination with a compound selected from the group consisting of a $C_1-C_{18}$ alkyl methacrylate, a $C_1-C_{18}$ alkyl acrylate and a mixture thereof.

2. A composition as defined in claim 1 wherein component (a)(i) comprises from about 15 to about 45 percent by weight; component (a)(ii) comprises from about 15 to about 45 percent by weight component (a)(iii) comprises from about 3 to about 50 percent by weight; and component (b) comprises from about 8 to about 25 percent by weight, all percentage proportions being based on the weight of the total various resinous components in the composition.

3. A composition as defined in claim 1 wherein component (a)(i) comprises a polyphenylene ether and a polystyrene.

4. A composition as defined in claim 1 wherein said polyphenylene ether comprises poly(2,6-dimethyl-1,4-phenylene ether).

5. A composition as defined in claim 3 wherein the polyphenylene ether comprises poly(2,6-dimethyl-1,4-phenylene ether).

6. A composition as defined in claim 1 wherein component (a)(ii) comprises poly(ethylene terephthalate); poly(butylene terephthalate) or a mixture thereof and component (a)(iii) comprises bisphenol A polycarbonate units.

7. A composition as defined in claim 6 wherein component (a)(ii) comprises poly(1,4-butylene terephthalate).

8. A composition according to claim 1 wherein component (a)(iii) comprises a polycarbonate hompopolymer.

9. A composition as defined in claim 1 wherein the grafted EPDM terpolymer is derived from approximately 45 to 70 mole percent ethylene, approximately 30-55 mole percent propylene and a minor amount of 5-ethylidene-2-norbornene.

10. A composition as defined in claim 2 wherein the EPDM-glycidyl ester grafted terpolymer is present in an amount of, approximately, 10 to 20 percent by weight based on the total weight of resins in the composition.

11. A composition as defined in claim 1 wherein in component (b) the EPFDM tereplymer is grafted with 2% more by weight based on said terpolymer of glycidyl methacrylate or glycidyl acrylate.

12. An article of manufacture comprising a container blow-molded from an impact modified thermoplastic composition as defined in claim 1.

* * * * *

UNITED STATES PATENT AND TRADEMARK OFFICE
CERTIFICATE OF CORRECTION

PATENT NO. : 4,916,185
DATED : April 10, 1990
INVENTOR(S) : John B. Yates, III, Charles Franklyn Pratt and Angelika Howard McHale It is certified that error appears in the above-identified patent and that said Letters Patent is hereby corrected as shown below:

On the cover page of the patent, below the last line of paragraph [76] and before paragraph [21] insert the following material:

[73] Assignee:     GENERAL ELECTRIC COMPANY

Pittsfield, MA

Signed and Sealed this

Third Day of September, 1991

Attest:

HARRY F. MANBECK, JR.

*Attesting Officer*      *Commissioner of Patents and Trademarks*